United States Patent
Horiuchi et al.

(10) Patent No.: US 11,844,660 B2
(45) Date of Patent: Dec. 19, 2023

(54) GYPSUM-BASED INVESTMENT MATERIAL COMPOSITION FOR CASTING, AND METHOD FOR MANUFACTURING GYPSUM-BASED INVESTMENT MATERIAL COMPOSITION FOR CASTING

(71) Applicant: YOSHINO GYPSUM Co., Ltd., Tokyo (JP)

(72) Inventors: Tatsuya Horiuchi, Tokyo (JP); Kenichi Sugano, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 16/652,865

(22) PCT Filed: Oct. 1, 2018

(86) PCT No.: PCT/JP2018/036757
§ 371 (c)(1),
(2) Date: Apr. 1, 2020

(87) PCT Pub. No.: WO2019/069874
PCT Pub. Date: Apr. 11, 2019

(65) Prior Publication Data
US 2020/0306020 A1    Oct. 1, 2020

(30) Foreign Application Priority Data

Oct. 5, 2017 (JP) ................................. 2017-195194

(51) Int. Cl.
*C04B 14/06*    (2006.01)
*C04B 24/02*    (2006.01)
(Continued)

(52) U.S. Cl.
CPC ................ *A61C 13/20* (2013.01); *B22C 1/08* (2013.01); *B22C 1/18* (2013.01); *B22C 7/02* (2013.01);
(Continued)

(58) Field of Classification Search
CPC ....... A61C 13/20; A61C 13/081; A61C 13/04; A61C 13/34; B22C 1/18; B22C 1/08;
(Continued)

(56) References Cited

U.S. PATENT DOCUMENTS 3,393,116 A * 7/1968 Larson .................. C04B 22/143
428/70
5,718,749 A * 2/1998 Horiuchi ................. C04B 28/14
106/38.35
(Continued)

FOREIGN PATENT DOCUMENTS

JP    50-113417    9/1975
JP    53-096027    8/1978
(Continued)

OTHER PUBLICATIONS

WO-2016043131-A1, also JPWO2016043131, Emiko, machine translation (Year: 2016).*
(Continued)

*Primary Examiner* — Anthony J Green
*Assistant Examiner* — Marites A Guino-O Uzzle
(74) *Attorney, Agent, or Firm* — Hamre, Schumann, Mueller & Larson, P.C.

(57) ABSTRACT

The present invention provides a gypsum-based embedding material composition for casting useful for forming a rapid-heating type gypsum-based embedding material and a method for producing the same. The gypsum-based embedding material is formed of the gypsum-based powdery embedding material composition by adding a malaxation
(Continued)

liquid into the composition and heating the mixture in a high-temperature furnace. The gypsum-based embedding material composition contains as main components, at least one co-pulverized material selected from a co-pulverized material of calcined gypsum and quartz, that of calcined gypsum and cristobalite, and that of calcined gypsum, quartz, and cristobalite. The composition further contains a powdery moisture-retaining component or a liquid moisture-retaining component having a low water content, and has an average particle diameter of 30 μm or less.

17 Claims, 1 Drawing Sheet

(51) Int. Cl.
*C04B 28/16* (2006.01)
*C04B 40/00* (2006.01)
*A61C 13/20* (2006.01)
*B22C 1/08* (2006.01)
*B22C 7/02* (2006.01)
*B22C 1/18* (2006.01)
*C04B 28/14* (2006.01)
*C04B 103/46* (2006.01)
*C04B 111/00* (2006.01)

(52) U.S. Cl.
CPC .............. *C04B 14/06* (2013.01); *C04B 24/02* (2013.01); *C04B 28/14* (2013.01); *C04B 28/16* (2013.01); *C04B 40/0042* (2013.01); *C04B 2103/465* (2013.01); *C04B 2111/00836* (2013.01)

(58) Field of Classification Search
CPC .... B22C 7/02; B22C 1/00; B22C 1/02; B22C 9/02; B22C 9/04; C04B 14/06; C04B 24/02; C04B 28/16; C04B 40/0042; C04B 2103/465; C04B 2111/00836; C04B 28/14; C04B 11/00; C04B 14/04; C04B 11/14; C04B 20/008; C04B 40/00; A61K 6/00
See application file for complete search history.

(56) References Cited

U.S. PATENT DOCUMENTS

| | | | |
|---|---|---|---|
| 2015/0080207 A1* | 3/2015 | Mamada | B22C 1/08 501/123 |
| 2015/0218052 A1* | 8/2015 | Ichino | A61C 13/34 106/35 |

FOREIGN PATENT DOCUMENTS

| | | | |
|---|---|---|---|
| JP | 53-096027 A * | 8/1978 | ............ C04B 11/14 |
| JP | 09-192778 | 7/1997 | |
| JP | 11-076270 | 3/1999 | |
| JP | H-1176270 A * | 3/1999 | |
| JP | 2001-353166 | 12/2001 | |
| JP | 2002-087918 | 3/2002 | |
| JP | 2004-073609 | 3/2004 | |
| JP | 4111491 | 7/2008 | |
| WO | 2014/034525 | 3/2014 | |
| WO | 2016/043131 | 3/2016 | |
| WO | WO-2016043131 A1 * | 3/2016 | ............ A61C 13/20 |

OTHER PUBLICATIONS

JPH-1176270-A, Koichi, machine translation (Year: 1999).*
Glycerin: an overview. [Retrieved from web at Oct. 6, 2021 <URL:https://www.aciscience.org/docs/Glycerine_-_an_overview.pdf.]. (Year: 1990).*
Krackeler Scientific (Glycerol, ACS reagent) [retrieved on May 12, 2022 from URL <https://www.krackeler.com/catalog/sigma/SIGALD/G7893>] (Year: 2013).*
WO-2016043131-A1, machine translation (Year: 2016).*
Spectrum Poloxamer 407 (2015). [retrieved from the internet on Mar. 1, 2023 <URL:https://images-na.ssl-images-amazon.com/images/I/71h4W8XbggL.pdf>] (Year: 2015).*
International Search Report, issued in the corresponding PCT application No. PCT/JP2018/036757, dated Oct. 30, 2018, 5 pages.
Indian Office Action, issued in the corresponding Indian patent application No. 202017013119, dated Aug. 10, 2021, 6 pages.

* cited by examiner

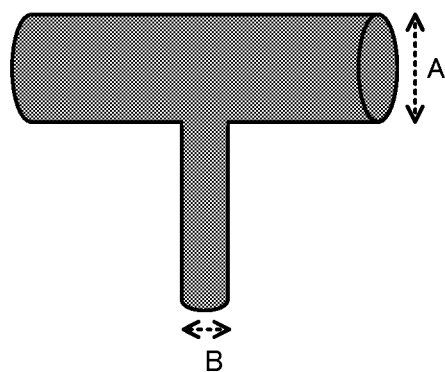

GYPSUM-BASED INVESTMENT MATERIAL COMPOSITION FOR CASTING, AND METHOD FOR MANUFACTURING GYPSUM-BASED INVESTMENT MATERIAL COMPOSITION FOR CASTING

TECHNICAL FIELD

The present invention relates to: a gypsum-based embedding material composition for casting, the composition to be used for a rapid-heating type embedding material; and a method for producing a gypsum-based embedding material composition for casting. More specifically, the present invention relates to a technique of providing: a gypsum-based embedding material composition for casting, the composition being capable of making time required for adding a malaxation liquid into the composition to make a slurry, burying a wax pattern, a resin pattern, or the like as a core with the slurry to set the slurry, and then putting a set product in a high-temperature furnace shorter than a conventional embedding material composition, contributing to making work efficient, and being useful particularly as an embedding material for dental use, or the like; and a method for producing the gypsum-based embedding material composition for casting.

BACKGROUND ART

An embedding material composition for casting, when described taking an embedding material for dental use as an example, refers to a mold material to be used for casting in preparing a prosthesis, such as a silver crown, through the steps as described below. Firstly, an original pattern (hereinafter, referred to as pattern) of a prosthesis is prepared with wax, a resin, or the like. On the other hand, a malaxation liquid is added to a powdery embedding material for dental use, and a resultant mixture is kneaded to prepare a slurry having a high fluidity. The pattern obtained above is buried as a core with the prepared slurry, thereby embedding the pattern and then leaving the embedded pattern for standing. When a certain time elapses, the slurry is set to become a set product in a state where the pattern is buried as the core. The obtained set product is heated under an appropriate condition. In this heating step (incineration step), only the pattern as the core disappears by incineration, and the incinerated portion becomes a cavity, so that a mold in which a cavity portion having a shape of a prosthesis, such as a silver crown, is formed inside is obtained. By casting a molten metal in the cavity portion of the mold, a metal prosthesis, such as a silver crown, having an intended shape is formed.

The embedding material for dental use is classified into a gypsum-based embedding material, a phosphate-based embedding material, and the like according to the type of binder, and the gypsum-based embedding material is widely used as a mold (gypsum mold) generally in casting a metal having a melting point of 1000° C. or lower. In the gypsum-based embedding material, cristobalite or quartz is used as a refractory material, gypsum is used as a binder, and water is generally used as a malaxation liquid. Hereinafter, a case where water is used as a malaxation liquid will be described as a representative example, and the malaxation liquid in that case refers to kneading water. In addition, the gypsum-based embedding material is classified into a usual heating type and a rapid-heating type according to the heating condition in the above-described incineration step. In the usual heating type, an embedded pattern as a core is incinerated by gradually raising the temperature from room temperature, meanwhile in the rapid-heating type, a set product is put into an incineration furnace the temperature of which is raised to a high temperature of 700° C. or 750° C. to incinerate the pattern. Therefore, the rapid-heating type gypsum-based embedding material makes it possible to realize higher workability than the usual type gypsum-based embedding material.

Particularly in the embedding material for dental use, it is considered from the purpose of use thereof that high size stability and surface smoothness are required in a cavity portion of a resultant mold (gypsum mold). Therefore, various proposals are made (see, for example, Patent Literature 1) from the viewpoint of obtaining a mold that satisfies the above-described properties in such an application.

CITATION LIST

Patent Literature

Patent Literature 1: Japanese Patent Laid-Open No. 2002-87918

SUMMARY OF INVENTION

Technical Problem

In the above-described circumstances, the present inventors have conducted diligent studies on the rapid-heating type gypsum-based embedding material which is widely used as an embedding material for dental use, or the like from the viewpoint of further improving work efficiency. In the rapid-heating type gypsum-based embedding material having a high workability, there has been a problem that a crack easily occurs in a mold because a set product is put into an incineration furnace the temperature of which is raised to a high temperature. In the case where a crack occurs in a mold (gypsum mold), a burr or the like occurs in a resultant cast product, such as a prosthesis, so that a pattern has to be prepared over again in some cases. It is known that the problem of the occurrence of a crack in a mold is associated with a set state of a set product when put into an incineration furnace, as will be described below.

With respect to the rapid-heating type gypsum-based embedding material, a slurry is prepared by kneading the embedding material and kneading water, and it is generally considered that the slurry has to be set by leaving the slurry to stand until the slurry is in a state such that the slurry is tolerable to heat shock when put into a high-temperature incineration furnace after a series of work. It is known that the above-described occurrence of a crack in a mold (gypsum mold) is associated with the set state of the slurry when put into a high-temperature incineration furnace, that is, associated with the above-described time (referred to as "leaving time") of leaving the slurry to stand for allowing the set to proceed. Specifically, the shorter this leaving time is, the more the work efficiency can be improved, but on the other hand, when a set product in a state where the leaving time is not sufficient is put into an incineration furnace the temperature of which is raised to a high temperature, a crack occurs in a mold, causing defective casting.

From the reason described above, embedding material products for dental use, the products each being a rapid-heating type gypsum-based embedding material, are designed on these points to be sold on the market, and for each product, a leaving time that is required in the product is specified. Specifically, in the case of a gypsum-based embedding material product for dental use, a leaving time that has to be kept, the leaving time having a meaning as a product with which putting a set product into a high-temperature incineration furnace is enabled 20 minutes or 30 minutes after starting measurement from a point in time when kneading with kneading water is started (a point in time when the embedding material for dental use comes into contact with kneading water), is specified. Therefore, for example, in the case where a 20-minute type, gypsum-based embedding material for dental use is used, a worker has to put a set product into an incineration furnace the temperature of which is raised to a high temperature after at least 20 minutes elapse from the time when measurement is started from the point in time when the embedding material comes into contact with the kneading water. In other words, the worker has to stop the work for a while after a core is buried with a slurry after malaxation. In the present invention, the time until the slurry becomes a set product in a state where rapid heating can be started, the time measured defining a time in point when the kneading water is added as a starting point, is specified as the "leaving time".

Facing the present circumstances described above, the present inventors have reached the recognition that when a product with which the above-described leaving time is made short can be provided, work is enabled in a shorter time than with a conventional product, and, in addition, when such a product is provided variously, a range in which designing according to a desired working situation is enabled by appropriately selecting products each having a different leaving time is expanded, so that such a product is useful in making work efficient Accordingly, an object of the present invention is to provide a gypsum-based embedding material composition for casting, the composition being useful as a rapid-heating type gypsum-based embedding material capable of making it possible to provide a product with which leaving time is made shorter than with a conventional product, which has never been realized in conventional products. Another object of the present invention is to provide a technique making it possible to provide a product in which the leaving time is designed appropriately in gypsum-based embedding material compositions for casting.

Solution to Problem

The above-described objects are achieved by the present invention described below. That is, the present invention provides a gypsum-based embedding material composition for casting described below.

[1] A gypsum-based embedding material composition for casting, the composition being a gypsum-based powdery embedding material composition for casting to be used for a rapid-heating type embedding material, the gypsum-based powdery embedding material composition for casting being such that a malaxation liquid is added into the composition to perform malaxation, a resultant mixture is then set, and a set product is put into a high-temperature furnace, wherein the gypsum-based embedding material composition for casting comprises as main components: calcined gypsum; quartz; and cristobalite, and comprises: at least one co-pulverized material selected from a co-pulverized material of calcined gypsum and quartz, a co-pulverized material of calcined gypsum and cristobalite, or a co-pulverized material of calcined gypsum, quartz, and cristobalite; and a powdery moisture-retaining component or a liquid moisture-retaining component having a low water content, the composition having an average particle diameter of 30 µm or less.

Preferred embodiments of the gypsum-based embedding material composition for casting of the present invention include the followings:

[2] the moisture-retaining component comprises a component selected from polyhydric alcohol or alcohols;

[3] the polyhydric alcohol or alcohols in [2] is at least any one selected from the group consisting of glycerin, propylene glycol, ethylene glycol, 1,3-butylene glycol, and polymers or copolymers thereof;

[4] the glycerin in [3] is glycerin having a purity of 98.5% or more;

[5] in any one of [1] to [4], a leaving time required for making the set product into a state enabling the rapid heating to be started, the leaving time measured defining a point in time when the malaxation liquid is added as a starting point, is 8 to 15 minutes;

[6] the leaving time in [5] is 8 to 10 minutes;

[7] the leaving time in [5] is 8 minutes;

[8] in any one of [1] to [7], the composition comprises 0.05 to 1.0 part by mass of the moisture-retaining component based on 100 parts by mass of the main components;

[9] in any one of [1] to [8], the composition is for dental use;

[10] in any one of [1] to [9], the composition further comprises gypsum dihydrate;

[11] the gypsum dihydrate in [10] is contained as the co-pulverized material;

[12] in any one of [1] to [11], a coefficient of setting expansion two hours after a point in time when the malaxation liquid is added is 0.2% or more and 3.0% or less; and

[13] in any one of [1] to [12], a total coefficient of expansion is 1.3% or more and 3.0% or less.

The present invention provides a method for producing a gypsum-based embedding material composition for casting, which is described below, as another embodiment.

[14] A method for producing a gypsum-based embedding material composition for casting, the method being a method for producing a rapid-heating type gypsum-based embedding material composition for casting to be used by putting a set product into a high-temperature furnace, the set product obtained by adding a malaxation liquid into the composition to perform malaxation and then setting a resultant mixture, wherein at least one co-pulverized material selected from the group consisting of a co-pulverized material of calcined gypsum and quartz, a co-pulverized material of calcined gypsum and cristobalite, and a co-pulverized material of calcined gypsum, quartz, and cristobalite is used, and further, a powdery moisture-retaining component or a liquid moisture-retaining component having a low water content is blended when calcined gypsum, quartz, and cristobalite being main components are blended, thereby preparing a powdery, gypsum-based embedding material composition for casting having an average particle diameter of 30 µm or less.

Preferred embodiments of the method for producing a gypsum-based embedding material composition for casting of the present invention include the followings.

[15] The method for producing a gypsum-based embedding material composition for casting according to [14], wherein the moisture-retaining component is blended such that 0.05 to 1.0 part by mass of the moisture-retaining component is contained based on 100 parts by mass of the main components.

[16] The method for producing a gypsum-based embedding material composition for casting according to [14] or [15], wherein gypsum dihydrate is further blended.

[17] The method for producing a gypsum-based embedding material composition for casting according to [14] or [15], wherein each of the co-pulverized materials to be used when calcined gypsum, quartz, and cristobalite being the main components are blended is a co-pulverized material obtained by co-pulverization further containing gypsum dihydrate.

Advantageous Effects of Invention

The present invention enables providing a useful gypsum-based embedding material composition for casting, the composition: capable of making leaving time short, which has never been realized in conventional rapid-heating type gypsum-based embedding products; and capable of obtaining a satisfactory mold (gypsum mold) in which occurrence of a crack due to heat shock is suppressed even if the leaving time is made short. In addition, according to the present invention, a technique that enables appropriate designing of the leaving time in gypsum-based embedding material compositions for casting is provided.

BRIEF DESCRIPTION OF DRAWINGS

FIG. 1 is a schematic diagram of a T-shaped wax pattern used in Study Examples.

DESCRIPTION OF EMBODIMENTS

Hereinafter, the present invention will be described in more detail giving preferred embodiments. The present inventors have conducted diligent studies in order to solve the above-described problems of the conventional technique to find that in a rapid-heating type gypsum-based embedding material, the leaving time can be made shorter than that in conventional products although the constitution is extremely simple, and a mold obtained by putting the rapid-heating type gypsum-based embedding material into a high-temperature incineration furnace is made satisfactory in that the occurrence of a crack due to heat shock is suppressed. For example, in a conventional rapid-heating type embedding material product for dental use, which is sold on the market, the leaving time from a point in time when the embedding material for dental use comes into contact with kneading water by adding the kneading water into the embedding material for dental use until the time when a set product in a state where a pattern is buried as a core is put into a high-temperature incineration furnace after a series of work is set to 20 minutes or 30 minutes, and therefore these times are required at the shortest. In contrast, by using the gypsum-based embedding material composition for casting of the present invention (hereinafter, simply referred to as "the composition of the present invention"), a satisfactory mold in which the occurrence of a crack due to heat shock is suppressed can be obtained even in the case where this leaving time is made short to about 8 to about 15 minutes, even in the case where this leaving time is made short to about 8 to about 10 minutes, or even in the case where this leaving time is further made short to about 8 minutes.

The composition of the present invention as well as conventional gypsum-based embedding material compositions has constitution such that as main components, calcined gypsum is used as a binder, and quartz and cristobalite are each used as a refractory material. Further, the composition of the present invention is constituted in such a way that these components are contained as at least any one of a dry type co-pulverized material of calcined gypsum and quartz, a dry type co-pulverized material of calcined gypsum and cristobalite, or a dry type co-pulverized material of calcined gypsum, quartz, and cristobalite, and the average particle diameter of the composition is 30 μm or less. Further, the composition is characterized by containing a powdery moisture-retaining component or a liquid moisture-retaining composition having a low water content in addition to this main component constitution. The present inventors have found that surprisingly, the "leaving time" can be made short without impairing the performance, such as fluidity, in conventional products, and a mold (gypsum mold) formed in a short time is made excellent in heat shock resistance in that the occurrence of a crack is suppressed by making the constitution such that the above-described co-pulverized material is used in the constitution of the main components, and the moisture-retaining component is contained in the main component constitution.

Specifically, it is found that the composition of the present invention is kneaded with water to make a slurry, a pattern is buried with the slurry, and even in the case where the leaving time set thereafter for setting the slurry is made shorter than that for conventional products, and the slurry is put into a high-temperature incineration furnace of 700° C. or 750° C., a formed mold is made such that the occurrence of a crack caused by heat shock is suppressed effectively. In addition, as a result of studies, the present inventors have found an astonishing fact that making the constitution such that the main components containing calcined gypsum are composed of a co-pulverized material and making the gypsum-based embedding material composition for casting into a powder having an average particle diameter of 30 μm or less contribute to realization of the above-described effect of making the leaving time short without impairing the quality obtained by a conventional product. This point will be described later with examples.

The reason that the leaving time can be made short in the present invention by making the constitution of the gypsum-based embedding material composition for casting such that a co-pulverized material obtained by co-pulverizing at least calcined gypsum and other main components in a dry process is used as the main components containing calcined gypsum, and the composition is made into a powder having an average particle diameter of 30 μm or less is uncertain. It is to be noted that the average particle diameter specified in the present invention refers to a volume average particle diameter measured by a laser diffraction/scattering method. According to studies conducted by the present inventors, one of the factors that bring about the above-described effects is in that the particle size of calcined gypsum can be made fine by making the constitution as described above. On the other hand, it has been found that only making the particle size of calcined gypsum fine brings about another problem that a flow value is lowered and the fluidity during the malaxation is deteriorated. Facing this problem, the present inventors have found that this problem can be remedied by co-pulverizing calcined gypsum and other main components. Therefore, by making the constitution such that the co-pulverized material of the main components containing calcined gypsum is used, and the average particle diameter is 30 μm or less, the present invention achieves both of making the leaving time short and the effect of suppressing the problem that the flow value is lowered caused by making the particle size of calcined gypsum fine.

The coefficient of setting expansion two hours after the point in time when the malaxation liquid (kneading water) is added, and the total coefficient of expansion which will be described later are measured by the methods described below for the composition of the present invention with which a formed mold (gypsum mold) is made such that the occurrence of a crack caused by heat shock is suppressed effectively, and studies have been conducted on the extent of these values at the time when satisfactory results are obtained. As a result, it can be ascertained that in the case where the coefficient of setting expansion two hours after the point in time when the kneading water is added is 0.2% or more and 3.0% or less, or in the case where the total coefficient of expansion is 1.3% or more and 3.0% or less, satisfactory results are obtained.

The coefficient of setting expansion two hours after the point in time when the kneading water is added is measured in the manner as described below using a specimen obtained in such a way that the gypsum-based embedding material composition for casting as an object of the measurement is put in 15 seconds into a rubber cup made of silicone rubber, the rubber cup having the kneading water contained therein, stirred for one minute, and thereafter poured into a form for measuring the coefficient of setting expansion. That is, the size immediately after pouring the composition malaxated with kneading water into the form is used as a standard, specifically a gauge installed at the form is set to zero at this point in time, and a value of the gauge two hours later is read to measure the coefficient of setting expansion two hours after the point in time when the kneading water is put into the cup.

The total coefficient of expansion used in the present invention is the sum of the "coefficient of setting expansion at the time when the leaving time elapses" and the "coefficient of thermal expansion" each measured in the manner as described below. These are each measured in the manner as described below using specimens obtained in such a way that the gypsum-based embedding material composition for casting as an object of the measurement is put in 15 seconds into a rubber cup made of silicone rubber, the rubber cup having the kneading water contained therein, stirred for one minute, and thereafter poured into a form for measuring the coefficient of setting expansion and a form for measuring the coefficient of thermal expansion.

The "coefficient of setting expansion at the time when the leaving time elapses" is measured in such a way that the size immediately after pouring the composition malaxated with the kneading water into the form is used as a standard, specifically a gauge at the form at this point in time is set to zero, and a value of the gauge at the time when the leaving time to be checked elapses is read. In addition, the "coefficient of thermal expansion" is measured by taking out the sample at the time when the leaving time elapses and heating the sample in the manner as described below. Specifically, the specimen (sample) taken out above is set in a thermal expansion meter (product name: TD5000SA, manufactured by Bruker Corporation), and the temperature is raised from room temperature at a rate of 10° C. per minute to measure the coefficient of thermal expansion at the time when the temperature reaches 700° C. It is to be noted that the measurement of the coefficient of thermal expansion is conducted in such a way that the size of the sample used for heating at the time when the leaving time elapses is used as a standard, and the amount of expansion relative to the standard is measured.

[Powdery Moisture-Retaining Component or Liquid Moisture-Retaining Component Having Low Water Content]

The composition of the present invention is characterized in that the basic constitution is as described above, and a powdery moisture-retaining component or liquid moisture-retaining component having a low water content is contained.

The present inventors have conducted diligent studies in order to solve the previously described problems of the conventional technique and to find a useful component with which the occurrence of a crack in a formed mold due to heat shock is suppressed even if the leaving time is made short by allowing the gypsum-based embedding material composition for casting to contain the above-described component other than the main components in the constitution in which the component is used. In the process of the studies, the present inventors have found that in the case where glycerin having a purity of 98.5% or more, the glycerin having a low water content, is contained, the occurrence of a crack caused by heat shock is suppressed in a formed mold even if the leaving time is made short.

As a result of further studies, the present inventors have found that the same effects are also obtained by allowing the powdery moisture-retaining component or the liquid moisture-retaining component having a low water content, not limited to glycerin having a purity of 98.5% or more, to be contained.

The powdery moisture-retaining component or the liquid moisture-retaining component having a low water content that constitutes the composition of the present invention include polyhydric alcohol or alcohols. Examples of the polyhydric alcohol or alcohols include the above-described glycerin having a purity of 98.5% or more (called purified glycerin), other glycerin, propylene glycol, ethylene glycol, 1,3-butylene glycol, and polymers or copolymers thereof.

According to studies conducted by the present inventors, the amount of the above-described moisture-retaining component to be used is preferably within a range of 0.05 to 1.0 part by mass based on 100 parts by mass of the main components. More preferably, the moisture-retaining component is preferably contained within a range of 0.1 to 1.0 part by mass, still more preferably 0.2 to 1.0 part by mass although the amount depends on the balance with the intended effect of making the leaving time short. When the amount is less than the above-described range, the effect of suppressing the occurrence of a crack in a mold formed by rapid heating is not exhibited sufficiently in some cases even though the leaving time can be made short. In addition, it is not preferable that the amount is more than the above-described range because the moisture-retaining component, when mixed with the main components by co-pulverization or the like, makes the co-pulverized material sticky. Hereinafter, the present invention will be described taking glycerin having a purity of 98.5% or more as a representative example of the moisture-retaining component, but the present invention is not limited thereto.

In addition, the description of the present invention focuses particularly on the embedding material for dental use; however, the range of utilizing the composition of the present invention is not limited to this, and, for example, even in the case where jewelry, art works, metal parts, and the like, for which a minute shape without a burr is required, are cast with a good yield efficiently, the composition of the present invention can be used without distinguishing these ranges of utilization.

Next, the main components that constitute the composition of the present invention will be described.

[Main Components]

The main components that constitute the composition of the present invention as well as those of conventional gypsum-based embedding material compositions are calcined gypsum, quartz, and cristobalite, and the combination thereof as well as conventional combinations may be such that the components are blended about one third each. More specifically, when the total amount of the main components is assumed to be 100 parts by mass, the combination may be, for example, such that about 25 to about 50 parts by mass of calcined gypsum is blended, about 10 to about 35 parts by mass of cristobalite is blended, and about 40 to about 65 parts by mass of quartz is blended.

(Calcined Gypsum)

Calcined gypsum that constitutes the composition of the present invention refers to a ½ hydrate of calcium sulfate [$CaSO_4 \cdot \tfrac{1}{2}H_2O$] and an anhydride of calcium sulfate [$CaSO_4$], and examples thereof include β gypsum hemihydrate, α gypsum hemihydrate, and III anhydrite, or mixtures thereof. Any calcined gypsum can be used in the present invention. According to studies conducted by the present inventors, α gypsum hemihydrate (α gypsum) is more preferably used taking the required strength of a mold during casting into consideration. Calcined gypsum reacts chemically with water to change easily into gypsum dihydrate and therefore is used as a binder.

A slurry obtained by adding an appropriate amount of water to the composition of the present invention and kneading a resultant mixture is solidified immediately when injected into a form using a pattern as a core. The composition of the present invention has the constitution such that a state of this set product formed by solidifying calcined gypsum is changed into a mold (gypsum mold) having an excellent heat shock resistance, by which the mold (gypsum mold) is unlikely to be subjected to heat shock, in a shorter leaving time as compared to the leaving times of conventional products. As a result, in the mold formed with the set product in which the leaving time is made short by incinerating the pattern as the core in a high-temperature incineration furnace to allow the pattern to disappear, the occurrence of a crack is suppressed effectively, and a cast product, such as a prosthesis, obtained using the mold is made satisfactory without a burr.

As described above, the composition of the present invention uses calcined gypsum as a binder and therefore is excellent in fluidity when a slurry is injected, and a resultant mold (gypsum mold) has advantages that deformation due to residual stress after calcination is small, a cast product can easily be taken out after casting, and a change with time is small.

(Quartz and Cristobalite)

The composition of the present invention contains quartz and cristobalite each as a refractory material and is not different from the conventional technique in this point. Accordingly, any of known materials used in conventional "gypsum-based embedding materials" can be used as each of these materials.

As described previously, the composition of the present invention is characterized by using calcined gypsum, quartz, and cristobalite, which are used as the main components, in a state where calcined gypsum and other main components are co-pulverized. By constituting the composition of the present invention in this way, the composition of the present invention makes a mold (gypsum mold) unlikely to be subjected to heat shock and excellent in heat shock resistance, the mold (gypsum mold) in the case where a set product obtained by making the leaving time shorter as compared to those of conventional products is put into a high-temperature incineration furnace. In addition, as will be described later, by using such a co-pulverized material, the problem of lowering of the flow value, which is seen in the composition having the constitution such that only calcined gypsum is pulverized, that is, the problem of lowering of the fluidity of a slurry can be suppressed.

(Gypsum Dihydrate)

Gypsum dihydrate can be added to the composition of the present invention. Thereby, the coefficient of setting expansion and coefficient of thermal expansion of the composition of the present invention can be made large. The method of adding gypsum dihydrate to the composition of the present invention is not particularly limited. For example, the constitution may be such that gypsum dihydrate is added when the above-described main components are co-pulverized, and the gypsum dihydrate is added as a co-pulverized material by co-pulverizing gypsum dihydrate with the main components, or the constitution may be such that gypsum dihydrate is added to the main components after co-pulverization. However, gypsum dihydrate is not an essential component for the composition of the present invention, but is an arbitrary component.

[Method for Producing Gypsum-Based Embedding Material Composition for Casting]

Next, a method for producing a gypsum-based embedding material composition for casting, by which the composition of the present invention can be obtained, will be described. The production method of the present invention is characterized in that at least one co-pulverized material selected from the group consisting of a co-pulverized material of calcined gypsum and quartz, a co-pulverized material of calcined gypsum and cristobalite, and a co-pulverized material of calcined gypsum, quartz, and cristobalite is used, and further, a powdery moisture-retaining component or a liquid moisture-retaining component having a low water content is blended when calcined gypsum, quartz, and cristobalite being the main components of the composition are blended, thereby preparing a powdery, gypsum-based embedding material composition for casting having an average particle diameter of 30 μm or less. That is, the production method of the present invention is characterized in that a co-pulverized material containing at least calcined gypsum is used as a main component raw material, a powdery moisture-retaining component or a liquid moisture-retaining component having a low water content is blended, and the average particle diameter is set in such a way as to be 30 μm or less, and the production method of the present invention is the same as the method for producing a conventional gypsum-based powdery embedding material composition for casting except those described above.

EXAMPLES

Next, the present invention will be described more specifically giving Study Examples. Hereinafter, part(s) or % is on a mass basis unless otherwise noted.

[Study Example 1] (Addition of Glycerin)

(Preparation of Gypsum-Based Embedding Material Composition for Casting)

A co-pulverized material having an average particle diameter of 15 μm, the co-pulverized material having a combination consisting of, as the main components, 30 parts of a gypsum, 20 parts of cristobalite, and 50 parts of a quartz powder, was used. When these components were co-pulverized by a dry process, purified glycerin (manufactured by Kao Corporation) having a purity of 98.5% or more was added separately in such a way as to make the concentrations 0.05 parts, 0.1 parts, 0.2 parts, 0.5 parts, 1.0 part, and 1.2 parts each based on 100 parts of the main components in terms of active ingredients, thereby obtaining six gypsum-based embedding material compositions for casting each having a different amount of glycerin blended. It is to be noted that the conditions of performing co-pulverization by a dry process were the same.

(Evaluation)

Each of set products obtained by performing a series of the procedures described below using each of the above-obtained compositions each having a different amount of glycerin blended, and changing the leaving time to three stages was put into a high-temperature incineration furnace, thereby forming each mold (gypsum mold). The heat shock resistances of the obtained molds were compared by the method described below.

A layer of a ceramic liner (product name: YS Liner 48, manufactured by Yoshino Gypsum Sales Co., Ltd.) was wounded in advance around an inner wall face of a stainless ring for casting having an inner diameter of 40 mm and a height of 50 mm, a T-shaped wax pattern the shape of which is shown in FIG. 1 was placed therein, and plurality of such stainless rings for casting were prepared. In FIG. 1, the reference sign A represents a diameter of a columnar portion to be a mold, and the reference sign B represents a diameter of a column to be an introduction passage for introducing a molten metal into the mold. A is 6 mm, and B is 2.5 mm.

Water was added to each of 100 parts of the gypsum-based embedding material compositions for casting prepared previously, and resultant mixtures were each malaxated, thereby obtaining slurries each having a different amount of glycerin blended. For comparison, a slurry was obtained under the same condition as the condition described above using a composition consisting of only a co-pulverized material of the main components, the co-pulverized material not containing glycerin. Next, each of the obtained slurries was separately poured into a ring for casting prepared in advance to embed the T-shaped wax pattern having a shape as described above, the pattern placed inside the ring for casting. On that occasion, 6 specimens formed from a composition having the same combination were obtained for each composition.

The set times of the slurries till the slurries were put into a high-temperature incineration furnace were changed in such a way that the leaving times were made 8 minutes, 10 minutes, and 15 minutes, and gypsum molds (molds) were obtained through the step of rapid-heating the set products after the leaving times. Subsequently, cast products were each prepared using each of the gypsum molds obtained. The states of these gypsum molds and cast molds were observed to investigate an influence of using gypsum-based embedding material compositions for casting each having a different amount of glycerin blended on the heat shock resistance. Specifically, specimens which were each set under a different leaving time condition were first put into an electric furnace (incineration furnace) the temperature of which was set to 700° C. in advance at the point in time 8 minutes, 10 minutes, and 15 minutes after the point in time when kneading water was added into the composition in order to obtain a slurry, wherein two specimens were put into the furnace for each point in time. After 30 minutes elapsed, the one was taken out of the furnace, and whether a crack exists or not in the taken-out gypsum mold was observed visually. The other gypsum mold was utilized directly for casting using a gold-solver-palladium alloy (gold 12%) (Product name: CASTWELL, manufactured by GC Corporation), and the surface state of an obtained cast product was observed visually.

The heat shock resistance of the gypsum molds (molds) obtained from the gypsum-based embedding material compositions for casting each having a different amount of glycerin blended and the cast products cast with the gypsum molds was evaluated from the results of the above-described visual observation by the criteria of 3 stages described below. The results are shown together in Table 1.

Good: A crack does not exist in the gypsum mold at all

Fair: Occurrence of a crack is recognized on the surface of the gypsum mold (the crack does not reach inside), but gives no influence on the cast product Poor: A crack that reaches a void inside exists in the gypsum mold and defective casting occurs in the cast product

TABLE 1

Influence of blending glycerin in composition on heat shock resistance

| | Amount of glycerin blended in gypsum-based embedding material composition for casting (parts) | | | | | | |
|---|---|---|---|---|---|---|---|
| | 0 | 0.05 | 0.1 | 0.2 | 0.5 | 1.0 | 1.2 |
| After leaving time of 8 minutes | Poor | Fair | Good | Good | Good | Good | Good |
| After leaving time of 10 minutes | Poor | Fair | Good | Good | Good | Good | Good |
| After leaving time of 15 minutes | Poor | Good | Good | Good | Good | Good | Good |

As can be seen from the results in Table 1, it was ascertained that by allowing the combination of the gypsum-based embedding material composition for casting to contain glycerin, the mold (gypsum mold) obtained using the composition is made excellent in heat shock resistance in that the occurrence of a crack due to heat shock is suppressed even if the time (leaving time) from coming into contact with water till putting into a high-temperature incineration furnace is made short. In addition, in the case where 1.2 parts of glycerin was contained in the combination of the gypsum-based embedding material composition for casting, the powder material became sticky, and therefore it was found that the amount of glycerin to be blended in the composition is preferably made within a range of 0.05 parts to 1.0 part. Further, the same tests as those described above were conducted using a T-shaped resin pattern in place of the T-shaped wax pattern used in the above-described study to obtain the same results as those described above.

[Study Example 2] (Particle Diameter of Gypsum)

From the results of Study Example 1, the amount of glycerin blended in the gypsum-based embedding material composition for casting was made 0.2 parts, and the combination of the main components was set to 30 parts of a gypsum, 20 parts of cristobalite, and 50 parts of the quartz powder, which were the same as those in Study Example 1. In Study Example 2, these main components were stirred and mixed without being co-pulverized to be made into a gypsum-based embedding material composition for casting which is for study, which was different from the case of Study Example 1. As a gypsum to be used in stirring and mixing, commercially available a gypsum of 40 µm (manufactured by Yoshino Gypsum Co., Ltd.) was pulverized to obtain a gypsum having an average particle diameter of 25 µm, 30 µm, and 35 µm separately, and these were used. As cristobalite, a commercially available powder of 20 µm was used, and as quartz, a commercially available powder of 20 µm was used. Thus, four compositions for study of the same constitution except that the average particle diameters of a gypsum were different were obtained. The average particle diameter of a gypsum refers to a measured value (volume average particle diameter) obtained by a laser diffraction/scattering method.

An influence of using each gypsum-based embedding material composition for casting on the heat shock resistance of a mold (gypsum mold) was evaluated for the four gypsum-based embedding material compositions for casting each having a different average particle diameter of a gypsum, the compositions obtained above by stirring and mixing, in the same manner as in Study Example 1, and the results are shown in Table 2. Further, the flow values for slurries each obtained by adding kneading water were measured to investigate the fluidity thereof. The results are shown together in Table 2.

TABLE 2

Influence of changing average particle diameter of α gypsum as main component on heat shock resistance

| | Average particle diameter of α gypsum (µm) | | | |
|---|---|---|---|---|
| | 25 | 30 | 35 | 40 |
| Leaving time of 8 minutes | Good | Good | Poor | Poor |
| Leaving time of 10 minutes | Good | Good | Fair | Poor |
| After leaving time of 15 minutes | Good | Good | Fair | Poor |
| Flow value (mm) | 69 | 78 | 85 | 100 |

As can be seen from the results shown in Table 2, it was ascertained that in the case where the leaving time is made short, making the particle size of a gypsum for use as a binder fine contributes to the effect of suppressing the occurrence of a crack that occurs in a resultant mold (gypsum mold) due to heat shock. However, it was ascertained that when the particle size of a gypsum for use in stirring and mixing is made short, there is a tendency that the flow value is lowered, so that it was found that another problem that the fluidity of a slurry is lowered arises in the case where α gypsum is made fine.

[Study Example 3](Co-Pulverization of Main Components)

As can be seen from the results of Study Example 2, it was ascertained that the effect of suppressing the occurrence of a crack which occurs in the obtained molds (gypsum molds) due to heat shock is obtained by pulverizing α gypsum to make the particle size fine. However, in this case, it was recognized that another problem that the fluidity of the slurries is lowered arises. Thus, studies on the effects in the case where α gypsum is co-pulverized with other components, not pulverized singly, were conducted in the manner as described below. The combinations of the main components were set to 30 parts of α gypsum, 20 parts of cristobalite, and 50 parts of quartz, and gypsum-based embedding material compositions for casting of the constitution such that a co-pulverized material of α gypsum and quartz, a co-pulverized material of α gypsum and cristobalite, and a co-pulverized material of α gypsum, quartz, and cristobalite were used separately were obtained. On that occasion, the main component not contained in the above-described co-pulverized material was pulverized singly in such a way as to have the same average particle diameter as that of the co-pulverized material, and was added to the above-described co-pulverized material to obtain compositions each containing α gypsum, cristobalite, and quartz as the main components. In addition, when co-pulverization was performed, three gypsum-based embedding material compositions for casting each having a different particle diameter were obtained in such a way that the average particle diameters of the co-pulverized materials were 25 µm, 30 µm, and 35 µm, separately. Further, in any of the cases, glycerin was blended in an amount of 0.2 parts in terms of pure content based on 100 parts of the main components when co-pulverization was performed.

The heat shock resistance of the gypsum molds (molds) each obtained in the same manner as in Study Example 1 using each of the above-obtained gypsum-based embedding material compositions for casting each having a different type and particle diameter of the co-pulverized materials was investigated. The results are shown in Table 3. It is to be noted that the average particle diameters in Table 3 are measurement results of the gypsum-based embedding material compositions for casting obtained.

TABLE 3

Influence of co-pulverizing main components and of difference in particle diameter on heat shock resistance

| Co-pulverized components | Gypsum and quartz | | | Gypsum and cristobalite | | | Gypsum, quartz, and cristobalite | | |
|---|---|---|---|---|---|---|---|---|---|
| Average particle diameter (µm) | 35 | 30 | 25 | 35 | 30 | 25 | 35 | 30 | 25 |
| Flow value (mm) | 120 | 112 | 105 | 128 | 114 | 107 | 135 | 133 | 130 |
| Leaving time of 8 minutes | Poor | Good | Good | Poor | Good | Good | Poor | Good | Good |
| Leaving time of 10 minutes | Fair | Good | Good | Fair | Good | Good | Fair | Good | Good |
| After Leaving time of 15 minutes | Fair | Good | Good | Fair | Good | Good | Fair | Good | Good |

As shown in Table 2, in Study Example 2 of the constitution such that α gypsum was pulverized singly as described previously, the effect of suppressing the occurrence of a crack which occurs in the formed molds (gypsum molds) due to heat shock was exhibited by pulverization, but another problem that the flow value is lowered and the fluidity of the slurry is lowered was brought about. In contrast, as shown in Table 3, it was ascertained that by co-pulverizing α gypsum with another main component or other main components and making the average particle diameter of the obtained gypsum-based embedding material composition for casting 30 µm or less, the fluidity at the time of malaxation is made sufficient without greatly lowering the flow value, and the effect of suppressing the occurrence of a crack which occurs in a mold (gypsum mold) and a cast product due to heat shock can be realized.

Measurement of the coefficients of expansion was conducted in the manner as described below for each sample of gypsum-based embedding material compositions for casting in Table 3 having an average particle diameter of 30 μm and of 25 μm. The coefficient of setting expansion two hours after the point in time when the kneading water was added was measured by the method described previously. Further, the coefficient of setting expansion of the specimen (set product) at the time when each leaving time elapsed and the coefficient of thermal expansion of the specimen at the time when each leaving time elapsed, when heated to 700° C., were measured to determine the total coefficient of expansion being the sum of these for each sample. As a result, the coefficient of expansion was within the range of 0.2% or more and 3.0% or less. In addition, it was ascertained that the total coefficient of expansion was within the range of 1.3% or more and 3.0% or less.

REFERENCE SIGNS LIST

A: represents a diameter (6 mm) of a portion to be a mold of a T-shaped wax pattern.
B: represents a diameter (2.5 mm) of a portion to be an introduction passage into a mold of a T-shaped wax pattern.

The invention claimed is:
1. A gypsum-based embedding material composition for casting, the gypsum-based embedding material composition for casting comprising, as main components:
   calcined gypsum in an amount from 25 to 50 parts by mass;
   quartz in an amount from 40 to 65 parts by mass; and
   cristobalite in an amount from 10 to 35 parts by mass, relative to a total amount of the main components as 100 parts by mass, and
the composition further comprising:
   a moisture-retaining component in an amount from 0.2 to 1.0 part by mass relative to the total amount of the main components as 100 parts by mass, the moisture-retaining component comprising a powdery moisture-retaining component or a liquid moisture-retaining component and having a water content in a range of 1.5 or less,
   wherein the composition comprises at least one co-pulverized material selected from the group consisting of a co-pulverized material of calcined gypsum and quartz, a co-pulverized material of calcined gypsum and cristobalite, and a co-pulverized material of calcined gypsum, quartz, and cristobalite,
   the composition has an average particle diameter in a range of 30 μm or less, and
   the composition is configured to form a gypsum-based embedding material with a leaving time in a range from 8 to 15 minutes when the gypsum-based embedding material is formed by adding a malaxation liquid to the composition so as to form a mixture of the composition and the malaxation liquid, setting the mixture, and heating the resulting set product of the mixture, wherein the leaving time is a time from the adding of the malaxation liquid to starting of the heating of the set product of the mixture.
2. The gypsum-based embedding material composition for casting according to claim 1,
   wherein the moisture-retaining component comprises at least one polyhydric alcohol.

3. The gypsum-based embedding material composition for casting according to claim 2,
   wherein the at least one polyhydric alcohol is at least one material selected from the group consisting of glycerin, propylene glycol, ethylene glycol, 1,3-butylene glycol, polymers thereof, and copolymers thereof.
4. The gypsum-based embedding material composition for casting according to claim 3,
   wherein the glycerin is glycerin having a purity in a range of 98.5% or more.
5. The gypsum-based embedding material composition for casting according to claim 1, wherein the leaving time is in a range from 8 to 10 minutes.
6. The gypsum-based embedding material composition for casting according to claim 1, wherein the leaving time is 8 minutes.
7. The gypsum-based embedding material composition for casting according to claim 1, wherein the gypsum-based embedding material is a dental article.
8. The gypsum-based embedding material composition for casting according to claim 1, further comprising gypsum dihydrate.
9. The gypsum-based embedding material composition for casting according to claim 8,
   wherein the gypsum dihydrate is contained in the at least one co-pulverized material.
10. The gypsum-based embedding material composition for casting according to claim 1,
   wherein the composition has a coefficient of setting expansion at two hours after the adding of the malaxation liquid in a range from 0.2% to 3.0%.
11. The gypsum-based embedding material composition for casting according to claim 1,
   wherein the composition has a total coefficient of expansion in a range from 1.3% to 3.0%.
12. The gypsum-based embedding material composition for casting according to claim 1,
   wherein the composition has the average particle diameter in a range from 15 μm to 30 μm.
13. A method for producing a gypsum-based embedding material composition for casting, the method comprising:
   mixing at least one co-pulverized material and a moisture-retaining component,
   wherein the at least one co-pulverized material is selected from the group consisting of a co-pulverized material of calcined gypsum and quartz, a co-pulverized material of calcined gypsum and cristobalite, and a co-pulverized material of calcined gypsum, quartz, and cristobalite,
   the composition comprises, as main components: calcined gypsum in an amount from 25 to 50 parts by mass, quartz in an amount from 40 to 65 parts by mass, and cristobalite in an amount from 10 to 35 parts by mass, relative to a total amount of the main components as 100 parts by mass,
   the composition further comprises the moisture-retaining component in an amount from 0.2 to 1.0 part by mass relative to the total amount of the main components as 100 parts by mass,
   the moisture-retaining component is a powdery moisture-retaining component or a liquid moisture-retaining component, and has a water content in a range of 1.5% or less,
   if quartz or cristobalite is absent from the at least one co-pulverized material, the absent quartz or the absent cristobalite is pulverized separately and added to the at least one co-pulverized material, so that the gypsum-based embedding material composition in a powder form having an average particle diameter in a range of 30 µm or less is prepared, and the composition is configured to form a gypsum-based embedding material with a leaving time in a range from 8 to 15 minutes when the gypsum-based embedding material is formed by adding a malaxation liquid to the composition so as to form a mixture of the composition and the malaxation liquid, setting the mixture, and heating the resulting set product of the mixture, wherein the leaving time is a time from the adding of the malaxation liquid to starting of the heating of the set product of the mixture.

14. The method for producing a gypsum-based embedding material composition for casting according to claim 13, wherein in the mixing, gypsum dihydrate is further present.

15. The method for producing a gypsum-based embedding material composition for casting according to claim 13, wherein each of the co-pulverized materials in the at least one co-pulverized material comprises gypsum dehydrate and is co-pulverized with the gypsum dehydrate.

16. A gypsum-based embedding material formed of the gypsum-based embedding material composition according to claim 1
wherein the gypsum-based embedding material is the heated product comprising the mixture of the composition and the malaxation liquid.

17. A method for producing a gypsum-based embedding material, the method comprising:
adding malaxation liquid into the gypsum-based embedding material composition according to claim 1;
forming the mixture of the composition and the malaxation liquid;
setting the mixture; and
heating the resulting set product in a furnace,
wherein the gypsum-based embedding material is formed with the leaving time in the range from 8 to 15 minutes.

* * * * *